(12) United States Patent
Nippa

(10) Patent No.: US 7,435,773 B1
(45) Date of Patent: Oct. 14, 2008

(54) RESIN COMPOSITE AND METHOD FOR PRODUCING THE SAME

(75) Inventor: Satoru Nippa, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/708,519

(22) Filed: Nov. 9, 2000

(30) Foreign Application Priority Data

Nov. 11, 1999 (JP) ................................. 11-320987

(51) Int. Cl.
*C08K 3/10* (2006.01)
(52) U.S. Cl. ....................... 524/437; 524/394; 524/399; 524/434; 524/458; 524/459; 524/460; 524/461; 523/220
(58) Field of Classification Search ................ 524/394, 524/399, 434, 437, 458, 459, 460, 461; 523/220
See application file for complete search history.

(56) References Cited

U.S. PATENT DOCUMENTS

| | | | |
|---|---|---|---|
| 4,366,272 A | 12/1982 | Kawamura et al. | |
| 4,491,553 A * | 1/1985 | Yamada et al. | 264/51 |
| 4,879,332 A * | 11/1989 | Saito et al. | 524/436 |
| 6,130,283 A * | 10/2000 | Nippa et al. | 524/437 |
| 6,207,775 B1 * | 3/2001 | Marti et al. | 526/160 |
| 6,242,522 B1 * | 6/2001 | Ezawa et al. | 524/437 |

FOREIGN PATENT DOCUMENTS

| | | |
|---|---|---|
| JP | 57-8226 A | 1/1982 |
| JP | 60233139 | 11/1985 |
| JP | 61009490 | 1/1986 |
| JP | 63-43206 A | 2/1988 |
| JP | 63291841 | 11/1988 |
| JP | 6-322243 A | 11/1994 |
| JP | 10-59713 A | 3/1998 |
| JP | 11-228711 A | 8/1999 |

* cited by examiner

*Primary Examiner*—Sanza L McClendon
(74) *Attorney, Agent, or Firm*—Birch, Stewart, Kolasch & Birch, LLP

(57) ABSTRACT

A resin composite having excellent tensile strength and a process for producing the composite are provided. The resin composite comprises a resin and aluminum hydroxide having an average primary-particle diameter of about 100 nm or smaller and has an index Y/X of 0.1 or less provided that the value X is an average intensity of intensities of aluminum characteristic X-ray measured by scanning a beam on a straight line on the composite with an electron-probe X-ray microanalyzer and the value Y is a standard deviation of the intensities.

4 Claims, 1 Drawing Sheet

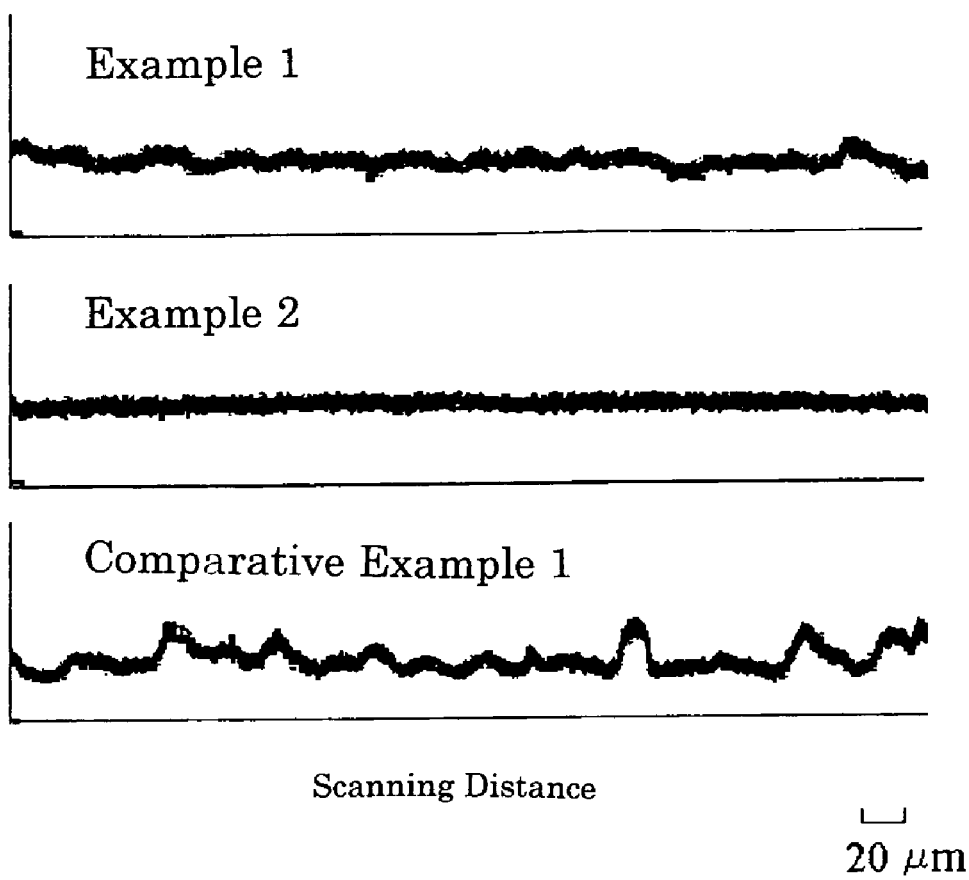

RESIN COMPOSITE AND METHOD FOR PRODUCING THE SAME

BACKGROUND OF THE INVENTION

1. Field of the Invention

The present invention relates to a resin composite and a method for producing the resin composite. In particular, the invention relates to a resin composite which may be used as a raw material for tires of automobiles, cushioning materials and the like and to a method for producing the resin composite.

2. Description of Related Art

Heretofore, a method in which a metal hydroxide is filled in a resin is known as a way for imparting reinforcement to resins. For example, Japanese Patent Laid-Open Publication No. 10-59713-A discloses a resin composite obtained by kneading styrene-butadiene rubber and aluminum hydroxide powder.

Even the resin composite disclosed in the Japanese Patent Laid-Open Publication No. 10-59713-A, however, does not necessarily have sufficient tensile strength and, therefore, a resin composite improved in tensile strength has been desired.

SUMMARY OF THE INVENTION

The objects of the present invention are to provide a resin composite having excellent tensile strength and to provide a method of producing such a resin composite.

After investigations into the improvement of tensile strength of resin composite, the present inventors have found that a resin compound having specific physical properties is excellent in tensile strength and completed the present invention.

That is, the present invention provides a resin composite comprising a resin and aluminum hydroxide having an average primary-particle diameter of about 100 nm or smaller, wherein said composite has an index Y/X of 0.1 or less provided that the value X is an average value of intensities of aluminum characteristic X-ray measured by scanning abeam on a straight line on the composite with an electron-probe X-ray microanalyzer and the value Y is a standard deviation of the intensities.

The present invention also provides a method for producing a resin composite comprising the steps of mixing an aqueous resin emulsion containing a resin with aluminum hydroxide having an average primary-particle diameter of 100 nm or smaller, letting the resin and the aluminum hydroxide therein aggregate to obtain a slurry containing a resin composite and separating the composite from the slurry.

BRIEF DESCRIPTION OF THE DRAWINGS

FIG. 1 shows electron-probe X-ray microanalyzer charts of sections of resin composites obtained in Examples 1 and 2 and Comparative Example 1 in the present application.

DETAILED DESCRIPTION OF THE INVENTION

The resin composite of the present invention contains a resin and aluminum hydroxide. Examples of the resin include synthetic resins such as vinyl acetate resin, acrylic resin, silicon resin, polybutene resin, copolymer resins and vinyl acetate with ethylene, styrene, acrylic acid or vinyl chloride, polystyrene, styrene-butadiene rubber, butadiene rubber, chloroprene rubber and isoprene rubber. These may be used alone or by mixing two or more of them.

The aluminum hydroxide to be used in the present invention has a chemical formula of $Al_2O_3 \cdot nH_2O$ (n is from 1 to 3) and has an average primary-particle diameter of about 100 nm or smaller, preferably of from about 1 nm to about 50 nm and more preferably of from about 10 nm to about 50 nm.

The average primary-particle diameter of aluminum hydroxide can be represented by Feret's diameter, which can be determined as a distance between two parallel lines crossing in the same direction in a transmission electron microscope visual field and holding a particle seen in the visual field therebetween (see, for example, Powder Technology Handbook, p. 4, 1965, published by Asakura Shoten). Crystalline structure of the aluminum hydroxide is preferably gibbsite, boehmite, bayerite, an amorphous form and the like. Boehmite is particularly recommended. The aluminum hydroxide having the above-described particle diameter can be produced by, for example, a method in which an aluminum alkoxide is hydrolyzed, a method in which an alkaline aluminate solution is mixed with an acidic solution such as aluminum sulfate solution or the like. In these methods, the obtained aluminum hydroxide may be washed with water or the like or may be passed through a continuous wet grinder or the like to form a suspension, which is then heated at a temperature of from 50° C. to 200° C. for a period of time of from 5 hours to 100 hours. A resin composite in the present invention contains the aluminum hydroxide preferably in an amount of not smaller than 1 part by weight, and more preferably in an amount of not smaller than 10 parts by weight, based on 100 parts by weight of the resin therein. Also, the resin composite contains the aluminum hydroxide preferably in an amount of not more than 200 parts by weight, and more preferably in an amount of not more than 100 parts by weight.

In the resin composite described above, the aluminum hydroxide is dispersed. A degree of the dispersion of the aluminum hydroxide in the resin composite may be evaluated by an index Y/X wherein the value X is an average value of intensities of aluminum characteristic X-ray measured by scanning a beam on a straight line on the composite by means of an electron-probe X-ray microanalyzer (hereinafter, referred to as EPMA) and the value Y is a standard deviation of the intensities. The measurements of EPMA may be conducted by applying a beam on a section of the resin composite sample with EPMA and scanning the beam on a straight line thereon so as to measure the characteristic X-ray intensities of aluminum at points on the line. Using the X-ray intensities obtained at all scanning points, the average intensity X of the characteristic X-ray and the standard deviation Y thereof can be calculated. When the amount of aluminum hydroxide in the resin composite is the same, the standard deviation Y itself can be used for representing the degree of the dispersion of the aluminum hydroxide in the resin composite. However, an absolute standard deviation varies even in the same dispersion degree depending on the amount of aluminum hydroxide, which is reflected in the average characteristic X-ray intensity X. Thus, in the present invention, both the average characteristic X-ray intensity X and the standard deviation Y obtained by the above-described method are utilized to show the degree of the dispersion of the aluminum hydroxide in the resin composite by the index Y/X, which is not influenced by the amount of the aluminum hydroxide contained in the resin composite. The higher the dispersion degree of aluminum hydroxide in a resin composite, the smaller the index Y/X. The resin composite in the present invention has an index Y/X of 0.1 or less. The index Y/X is preferably 0.07 or less, and more preferably 0.04 or less. The longer the distance of scanning the beam on the resin composite sample in EPMA measurement is, the more accurate the dispersion degree of aluminum hydroxide in a resin composite may be shown. In the present invention, the distance is preferably about 100 μm or longer, more preferably about 200 μm or longer.

The resin composite of the present invention can be produced, for example, by mixing an aqueous resin emulsion containing a resin with aluminum hydroxide having an average primary-particle diameter of 100 nm or smaller, stirring the resulting mixture, letting the resin and the aluminum hydroxide in the resulting mixture aggregate to obtain a slurry containing a resin composite and separating the composite from the slurry. In a method in which a resin and aluminum hydroxide is kneaded, the aluminum hydroxide does not disperse sufficiently in the resulting resin composite and it is difficult to obtain a resin composite having the above-described index Y/X.

Examples of the aqueous resin emulsion used for producing the resin composite in the present invention include an emulsion obtained by dispersing, in water, particles of synthetic resin which may have a surface potential possessing the same sign as that of aluminum hydroxide in water to make an emulsion. Examples of the synthetic resin include vinyl acetate resin, acrylic resin, silicon resin, polybutene resin, a copolymer resin of vinyl acetate and a monomer selected from ethylene, styrene, acrylic acid and vinyl chloride, a copolymer resin of acrylonitrile and styrene, polystyrene, styrene-butadiene rubber, butadiene rubber, chloroprene rubber and isoprene rubber. An average particle diameter of these resins may be 0.5 μm or smaller. Among the aqueous resin emulsions containing such synthetic resins, it is preferred to use styrene-butadiene rubber latex, butadiene rubber latex, chloroprene rubber latex and isoprene rubber latex. The aqueous resin emulsion may contain a disperse medium other than water. Examples of such a disperse medium include alcohols having solubility with water. A solid content of the aqueous resin emulsion may fall within a range of from about 20% by weight to about 80% by weight.

The aluminum hydroxide to be mixed with the aqueous resin emulsion has an average primary-particle diameter of about 100 nm or smaller, preferably of from about 1 nm to about 50 nm and more preferably of from about 10 nm to about 50 nm. It is preferred that the aluminum hydroxide has an average secondary-particle diameter of about 3 μm or smaller, more preferably of about 1 μm or smaller. Crystalline structure of the aluminum hydroxide is preferably gibbsite, boehmite, bayerite, an amorphous form or the like. Boehmite is particularly recommended. The aluminum hydroxide may be mixed with the aqueous resin emulsion, in the form of a suspension, a colloidal solution or a water-containing solid. The water-containing solid to be used may contain water in amount of from about 50% by weight to about 70% by weight. The amount of aluminum hydroxide to be mixed with the aqueous resin emulsion may be determined so that the aluminum hydroxide is contained in a desired amount in the resulting resin composite.

The mixing of the aqueous resin emulsion with the aluminum hydroxide having an average primary-particle diameter of 100 nm or smaller is preferably performed under such conditions that a surface potential of the resin in the resulting mixture has the same sign as that of a surface potential of the aluminum hydroxide in the resulting mixture. For example, the mixing can be performed by a method in which pH of an aluminum hydroxide slurry is adjusted to be from about 4 to about 9 and then an emulsion of a resin having a positive surface potential at the adjusted pH is added to the aluminum hydroxide slurry, a method in which pH of an aluminum hydroxide slurry is adjusted to be from about 10 to about 12 and then an emulsion of a resin having a negative surface potential at the adjusted pH is added to the aluminum hydroxide slurry, a method in which to water having pH of from about 4 to about 9 are added aluminum hydroxide and an emulsion of a resin having a positive surface potential at the pH of the water and a method in which to water having pH of from about 10 to about 12 are added aluminum hydroxide and an emulsion of a resin having a negative surface potential at the pH of the water. In these methods, the surface potential of the aluminum hydroxide is adjusted with pH. The surface potential of the aluminum hydroxide may also be adjusted by treating the surface of the aluminum hydroxide with anionic chemicals or cationic chemicals. When the surface potential of the aluminum hydroxide has a different sign from that of the surface potential of the resin in the mixture, heterogeneous aggregation may occur in mixing the aqueous resin emulsion and the aluminum hydroxide. A surface potential of the resin can be represented by a zeta potential of the particles thereof in the aqueous resin emulsion. A surface potential of aluminum hydroxide can be represented by a zeta potential of the aluminum hydroxide at the same pH as that of water in the suspension, colloidal solution or water-containing solid containing the aluminum hydroxide. The mixing is preferably performed under such conditions that pH of the aqueous resin emulsion is substantially the same as that of the water in the suspension, colloidal solution or water-containing solid containing the aluminum hydroxide. The difference between the former pH and the latter pH may be about 1 or less, preferably about 0.5 or less.

It is preferred that to the mixture obtained by mixing the aqueous resin emulsion and the aluminum hydroxide having an average primary-particle diameter of 100 nm or smaller, are added an inorganic salt that exhibits a salt-out effect such as sodium chloride, an amine-based oligomer, a polymer flocculating agent such as poly(sodium acrylate) and the like, if necessary. In particular, the polymer flocculating agent is preferably utilized. The use of polymer flocculating agent results in improvement in solid-liquid separability of solid materials made from the resin emulsion and aluminum hydroxide in the mixture. In the step of the mixing may be added an additive such as an extender oil, which may be called a "process oil", an antioxidant, an age resistor, stearic acid, zinc oxide, wax and a coagulating aid, a vulcanizing agent such as sulfur or a vulcanization accelerator.

In the present invention, the mixture obtained by mixing the aqueous resin emulsion and the aluminum hydroxide diameter is then stirred to let the resin and the aluminum hydroxide therein aggregate and to provide a slurry. The aggregation may be performed, for example, by changing pH of the mixture or by dropping the mixture into a saturated solution of an inorganic salt. Specifically, the aggregation may be performed by a method in which a mixture having pH of 10-12 made from the aqueous resin emulsion and the aluminum hydroxide is dropped into an acidic solution, a method in which a mixture having pH 4-9 made from the aqueous resin emulsion and the aluminum hydroxide is dropped into an alkaline solution or a method in which a mixture of the aqueous resin emulsion and the aluminum hydroxide is dropped into a saturated sodium chloride solution. In the method of dropping the mixture into the acidic solution, the dropping is preferably conducted while an acid such as sulfuric acid, nitrous acid or hydrochloric acid is also added into the acidic solution so as to adjust the pH of the resulting mixture to the initial pH of the acidic solution. In the method of dropping the mixture into the alkaline solution, the dropping is preferably conducted while a base such as sodium hydroxide or ammonia is also added into the alkaline solution so as to adjust the pH of the resulting mixture to the initial pH of the alkaline solution.

The slurry obtained after the aggregation is separated into an aqueous solution and a solid resin composite comprising the resin and the aluminum hydroxide. The separation may be carried out by vacuum filtration, pressure filtration, centrifugal separation or the like. The obtained resin composite may be dried, if necessary. The drying may be conducted by using a continuous material transferring-type drier such as a through-flow band drier, a tunnel drier and an apron drier, a material stirring-type drier such as a trench-type stirring drier and a kneading-type drier or the like. Drying temperature may fall within a range of from about 50° C. to about 130° C.

The resin composite obtained by the separation has excellent tensile strength. The resin composite is also superior in flame resistance to conventional resin composites which contain aluminum hydroxide in the same amount. The resin composite may contain a vulcanizing agent, a vulcanization accelerator, a vulcanization accelerating aid, a vulcanization decelerator, an age resistor, a softening agent, an adhesive, a filler other than aluminum hydroxide, an extending agent or a colorant when the resin contained therein is styrene-butadiene rubber, butadiene rubber, chloroprene rubber or isoprene rubber. If necessary, the resin composite which contains such an additive may be kneaded and subjected to a vulcanization treatment such as press vulcanization, can vulcanization, transfer molding vulcanization, injection molding vulcanization or extruding continuous vulcanization. The resin composite can be utilized for preparing a master batch having an increased amount of the aluminum hydroxide. The master batch may be produced in the same method as that of the resin composite described above except that a ratio of the aluminum hydroxide to the resin is higher than that of the above-described resin composite. The master batch is kneaded with a prescribed amount of resin and then molded to provide a molding article.

The resin composite in the present invention can be used, for example, as a raw material of a tire (tread, tube or the like) of automobiles, cushioning material, a belt, a hose, a foam, a film, a carpet-backing material, an electric wire-covering material or the like.

The resin composite in the present invention has excellent tensile strength and is useful as a molding article or a raw material thereof. The method for producing the resin composite in the present invention provides a resin composite having excellent tensile strength.

EXAMPLES

The present invention is described in more detail by following Examples, which should not be construed as a limitation upon the scope of the present invention.

Example 1

Into a glass container, was fed 286 g of aluminum hydroxide slurry (crystalline structure: boehmite, average primary-particle diameter: 5 nm, solid content: 7% by weight) obtained by hydrolysis of aluminum alkoxide. The slurry was adjusted to have pH of 10.7 and heated to 65° C. To the slurry, was added 410 g of styrene-butadiene rubber latex (styrene content: 35% by weight, solid content: 24.4% by weight, sign of surface potential: negative, pH 10.7, manufactured by Sumitomo Chemical Co., Ltd.) which had been heated to 65° C. The resulting mixture was stirred at 600 rpm. Into the mixture under stirring, were added in turn 260 mL of a 25% by weight of aqueous NaCl solution, 0.2 g of an age resistor (trade name: Antigene 6C, manufactured by Sumitomo Chemical Co., Ltd.) and 37.5 g of an extender oil (tradename: Fukkol Aromax-3, manufactured by Fujikosan Co., Ltd.) to obtain a viscous mixture.

1.85 L of water, 337 mL of a 25% by weight of aqueous NaCl solution, 269 mL of 0.1 N sulfuric acid and 0.44 g of a coagulating aid (trade name: Sumirez TE-5, manufactured by Sumitomo Chemical Co., Ltd.) were mixed with each other and heated to 65° C. Into the resulting mixture under stirring at 600 rpm, was dropped the above-obtained viscous mixture using a separating funnel and aggregated to obtain a slurry. The dropping was performed while adjusting pH of the mixture to 3.6-4.0 by appropriately adding 0.1 N sulfuric acid. After the completion of the dropping, the obtained slurry was stirred for 10 minutes and divided into a cake and a filtrate using a vacuum filter. The obtained cake was washed with two parts by weight of 80° C. water based on the cake. After the washing, the cake was ground into about 1-cm cubes and dried at 80° C. for four hours using an oven.

Into Labo Plastomill (which is its trade name, model: 20-200C, blade: B-75, manufactured by Toyo Seiki Seisakusyo Co., Ltd.), was put 47 g of the above-obtained dry cake, and then kneaded at a temperature of 105° C. with a rotation speed of 80 rpm. Then into the kneaded mixture, were added 0.3 g of a vulcanization accelerator (trade name: Soxinol CZ, manufactured by Sumitomo Chemical Co., Ltd.), 0.3 g of another vulcanization accelerator (trade name: Soxinol D, manufactured by Sumitomo Chemical Co., Ltd.), 0.42 g of sulfur, 0.6 g of zinc oxide, 0.6 g of stearic acid, 0.45 g of an age resistor (trade name: Antigene 3C, manufactured by Sumitomo Chemical Co., Ltd.), 0.45 g of wax (trade name: SUNNOC-N, manufactured by Ouchi-Shinko Chemical Industrial Co., Ltd.), and then kneaded for 5 minutes. After the kneading, the resulting mixture was subjected to vulcanization molding for 20 minutes using a 170° C. hot press to obtain a resin composite.

On a section of the obtained resin composite, was scanned a beam with an EPMA (trade name: EPM-810Q, manufactured by Shimadzu Corp.) under the conditions of an acceleration voltage of 20 kV, an absorption current of 0.01 µA, a beam diameter of 10 µm and a scanning distance of 400 µm, to measure intensities of the characteristic X-ray of aluminum. An average intensity X of the measured characteristic X-ray and the standard deviation Y of the intensities were calculated and then the index Y/X was also calculated. The index Y/X was found to be 0.038. The obtained EPMA chart is shown in FIG. 1. The resin composite was molded and cut into a No. 3 dumbbell-shaped specimen. The tensile strength of the specimen was measured with Autograph AGS-500B (which is its trade name, manufactured by Shimadzu Corp.) in accordance with JIS K-6251, and found to be 6.8 MPa.

Comparative Example 1

Into Labo Plastomill (which is its trade name, model: 20-200C, blade: B-75, manufactured by Toyo Seiki Seisakusyo Co., Ltd.), were put 6 g of aluminum hydroxide powder (crystalline structure: boehmite, average primary-particle diameter: 13 nm) obtained by hydrolysis of aluminum alkoxide followed by drying and 41 g of styrene-butadiene rubber (trade name: Sumitomo SBR HS-1, manufactured by Sumitomo Chemical Co., Ltd.), and then kneaded at a temperature of 105° C. with a rotation speed of 80 rpm. Then, into the kneaded mixture, were added 0.3 g of a vulcanization accelerator (trade name: Soxinol CZ, manufactured by Sumitomo Chemical Co., Ltd.), 0.3 g of another vulcanization accelerator (trade name: Soxinol D, manufactured by Sumitomo Chemical Co., Ltd.), 0.42 g of sulfur, 0.6 g of zinc oxide, 0.6 g of stearic acid, 0.4 g of an age resistor (trade name: Antigene 3C, manufactured by Sumitomo Chemical Co., Ltd.) and 0.45 g of wax (trade name: SUNNOC-N, manufactured by Ouchi-Shinko Chemical Industrial Co., Ltd.), and then kneaded for 5 minutes. The resulting mixture was subjected to vulcanization molding for 20 minutes using a 170° C. hot press to obtain a resin composite.

As for the obtained resin composite, the index Y/X and tensile strength were measured in the same manner as in Example 1. The index Y/X and tensile strength were found to be 0.116 and 4.1 MPa, respectively. The EPMA chart is shown in FIG. 1.

Example 2

Into a glass container, was put 1430 g of aluminum hydroxide slurry (crystalline structure: boehmite, average primary-particle diameter: 13 nm, solid content: 7% by weight) obtained by hydrolysis of aluminum alkoxide. The slurry was adjusted to have pH of 11 and heated to 65° C. To the slurry, was added 435 g of styrene-butadiene rubber latex (styrene content: 35% by weight, solid content: 22.9% by weight, sign of surface potential: negative, pH 10.7, manufactured by Sumitomo Chemical Co., Ltd.) which had been heated to 65° C. The resulting mixture was stirred at 600 rpm. Into the mixture under stirring, were added 184 mL of a 25% by weight of aqueous NaCl solution and then a mixed liquid obtained by mixing 2.87 g of an antioxidant (trade name: SL-TNP, manufactured by Kyodo Chemical Co., Ltd.), 0.57 g of oleic acid (reagent grade, manufactured by Wako Pure Chemical Industries, Ltd.), 0.064 g of potassium hydroxide (reagent grade, manufactured by Wako Pure Chemical Industries, Ltd.) and 16.52 g of water. The resulting mixture was mixed to obtain a viscous mixture.

6.46 L of water, 1385 g of a 25% by weight of aqueous NaCl solution, 678 g of 0.1 N sulfuric acid and 1.76 g of a coagulating aid (trade name: HAKUTOL R-107; manufactured by Hakuto Chemical Co., Ltd.) were mixed with each other and heated to 65° C. Into the resulting mixture under stirring at 600 rpm, was dropped the above-obtained viscous mixture using a separating funnel and aggregated to obtain a slurry. After the completion of the dropping, the slurry was stirred for 10 minutes and divided into a cake and a filtrate using a vacuum filter. The obtained cake was washed with two parts by weight of 80° C. water based on the cake. After the washing, the cake was ground into about 1-cm cubes and dried in at 80° C. for four hours using an oven. The obtained dry cake was subjected to press molding under a molding pressure of 1 MPa at 160° C. for five minutes, to obtain a molding article having a length of 150 mm, a width of 150 mm and a thickness of 3 mm.

As for the obtained molding article, the index Y/X was measured in the same manner as in Example 1. The index Y/X was found to be 0.017. The EPMA chart is shown in FIG. 1. The molding article was stamped out with a cutting machine (manufactured by Dumbbell Co., Ltd.) into a specimen having a length of 125 mm, a width of 6.5 mm and a thickness of 3 mm. An oxygen index of this specimen was measured with an oxygen index system combustion tester (model: ON-1, manufactured by Toyo Rika Kogyo Ltd.) in accordance with JIS-K7201. The oxygen index was found to be 23.

Comparative Example 2

Into a Banbury mixer, were put 100 g of aluminum hydroxide powder (crystalline structure: boehmite, average primary-particle diameter: 13 nm) obtained by hydrolysis of aluminum alkoxide followed by drying and 100 g of styrene-butadiene rubber (trade name: Sumitomo SBR #1500, manufactured by Sumitomo Chemical Co., Ltd.) and then kneaded. The resulting mixture was subjected to press molding under a molding pressure of 1 MPa at 160° C. for 5 minutes to obtain a molding article having a length of 150 mm, a width of 150 mm and a thickness of 3 mm.

As for the obtained molding article, an oxygen index was measured under the same conditions as in Example 2. The oxygen index was found to be 22.

Compared to the molding article obtained in Comparative Example 2, the molding article obtained in Example 2 has a higher oxygen index, which means the article in Example 2 is superior in flame resistance, as well as has higher tensile strength.

Example 3

Into a glass container, was put 1429 g of aluminum hydroxide slurry (crystalline structure: boehmite, average primary-particle diameter: 5 nm, solid content: 7% by weight) obtained by hydrolysis of aluminum alkoxide. The slurry was adjusted to have pH of 10.7 and heated to 65° C. To the slurry, was added 410 g of styrene-butadiene rubber latex (styrene content: 35% by weight, solid content: 24.4% by weight, sign of surface potential: negative, pH 10.7, manufactured by Sumitomo Chemical Co., Ltd.) which had been heated to 65° C. The resulting mixture was stirred at 600 rpm. Into the mixture under stirring, were added in turn 224 mL of a 25% by weight of aqueous NaCl solution, 0.2 g of an age resistor (trade name: Antigene 6C, manufactured by Sumitomo Chemical Co., Ltd.), 37.5 g of an extender oil (trade name: Fukkol Aromax-3, manufactured by Fujikosan Co., Ltd.) to obtain a viscous mixture.

169 ml of a 0.1% by weight of aqueous flocculating agent solution prepared by dissolving a polymer flocculating agent (trade name: Sumifloc FN-10H; manufactured by Sumitomo Chemical Co., Ltd.) in water, 9.7 L of water, 1.8 L of a 25% by weight of aqueous NaCl solution and 1.4 L of 0.1 N sulfuric acid were mixed with each other and heated to 65° C. To the resulting mixture under stirring at 600 rpm, was dropped the above-obtained viscous mixture using a separation funnel and aggregated to obtain a slurry. The dropping was performed while adjusting pH of the mixture to pH3.6-4.0 by appropriately adding 0.1 N sulfuric acid. After the completion of the dropping, the slurry was stirred for 10 minutes and then left stand. After that, solid materials in the slurry were precipitated. The supernatant fluid therein was sucked out with an aspirator and the remaining concentrated slurry was divided into a cake and a filtrate using a vacuum filter. The obtained cake was washed with two parts by weight of 80° C. water based on the cake. After the washing, the cake was ground into about 1-cm cubes and dried at 80° C. for four hours using an oven. Except for using the dry cake obtained here, the same manner as in Example 1 was conducted to produce a resin composite.

Example 4

1.17 Gram of a coagulating aid (trade name: Sumirez TE-5, manufactured by Sumitomo Chemical Co., Ltd.), 9.7 L of water, 1.8 L of a 25% by weight of aqueous NaCl solution and 1.4 L of 0.1 N sulfuric acid were mixed with each other and heated to 65° C. To the resulting mixture under stirring at 600 rpm, was dropped using a separation funnel a viscous mixture obtained in the same manner as in Example 3 and aggregated to obtain a slurry. The dropping was performed while adjusting the resulting mixture to have pH of 3.6-4.0 by appropriately adding 0.1 N sulfuric acid. After the completion of the dropping, the slurry was stirred for 10 minutes and then left stand. After being left stand, no solid material was precipitated in the slurry. The slurry was divided into a cake and a filtrate using a vacuum filter. The resulting cake was washed with two parts by weight of 80° C. water based on the cake. After the washing, the cake was ground into about 1-cm cubes and dried at 80° C. for four hours using an oven. Except for using the dry cake obtained here, the same manner as in Example 1 was conducted to produce a resin composite.

What is claimed is:

1. A resin composite comprising a resin and aluminum hydroxide having an average primary-particle diameter of about 50 nm or smaller, wherein said composite has an index Y/X of 0.04 or less provided that the value X is an average value of intensities of aluminum characteristic X-ray measured by scanning a beam on a straight line on the composite with an electron-probe X-ray microanalyzer and the value Y is a standard deviation of the intensities.

2. The resin composite according to claim 1 wherein the resin is a synthetic resin selected from the group consisting of vinyl acetate resin, acrylic resin, silicon resin, polybutene resin, copolymer resins of vinyl acetate and ethylene, styrene, acrylic acid or vinyl chloride, polystyrene, styrene-butadiene rubber, butadiene rubber, chloroprene rubber and isoprene rubber.

3. A method for producing the resin composite of claim 1, said method comprising the steps of mixing an aqueous resin emulsion containing a resin with aluminum hydroxide having an average primary-particle diameter of 50 nm or smaller, letting the resin and the aluminum hydroxide therein aggregate to obtain a slurry containing the resin composite and separating the composite from the slurry.

4. The process according to claim 3 wherein the aqueous resin emulsion is an emulsion which is prepared by dispersing and emulsifying a synthetic resin selected from the group consisting of vinyl acetate resin, acrylic resin, silicon resin, polybutene resin, copolymer resins of vinyl acetate and ethylene, styrene, acrylic acid or vinyl chloride, polystyrene, styrene-butadiene rubber, butadiene rubber, chloroprene rubber and isoprene rubber, in water.

* * * * *